US012084600B2

(12) United States Patent
Thiebes et al.

(10) Patent No.: US 12,084,600 B2
(45) Date of Patent: *Sep. 10, 2024

(54) USE OF ESSENTIAL OILS FOR SEPARATING ADHESIVE BONDS

(71) Applicant: Covestro Deutschland AG, Leverkusen (DE)

(72) Inventors: Christoph Thiebes, Cologne (DE); Joerg Buechner, Bergisch Gladbach (DE); Thomas Fait, Troisdorf (DE); Oliver Kirstein, Wuppertal (DE)

(73) Assignee: Covestro Deutschland AG, Leverkusen (DE)

( * ) Notice: Subject to any disclaimer, the term of this patent is extended or adjusted under 35 U.S.C. 154(b) by 113 days.

This patent is subject to a terminal disclaimer.

(21) Appl. No.: 17/912,139

(22) PCT Filed: Mar. 19, 2021

(86) PCT No.: PCT/EP2021/057041
§ 371 (c)(1),
(2) Date: Sep. 16, 2022

(87) PCT Pub. No.: WO2021/191060
PCT Pub. Date: Sep. 30, 2021

(65) Prior Publication Data
US 2023/0138157 A1 May 4, 2023

(30) Foreign Application Priority Data
Mar. 23, 2020 (EP) .................................... 20164802

(51) Int. Cl.
*C09J 5/00* (2006.01)
*C09J 175/04* (2006.01)

(52) U.S. Cl.
CPC .............. *C09J 5/00* (2013.01); *C09J 175/04* (2013.01); *C09J 2301/502* (2020.08); *C09J 2475/00* (2013.01)

(58) Field of Classification Search
CPC ..... C08K 9/10; C09J 175/04; C09J 2301/412; C09J 2301/502; C09J 2475/00; C09J 2475/003; C09J 2483/003; C09J 5/00; C09J 5/02
USPC ........... 156/60, 94, 289, 314, 701, 703, 704, 714, 156/715, 718, 719
See application file for complete search history.

(56) References Cited

U.S. PATENT DOCUMENTS

| | | | |
|---|---|---|---|
| 4,635,415 | A | 1/1987 | Schumacher et al. |
| 4,882,399 | A | 11/1989 | Tesoro et al. |
| 6,245,177 | B1 | 6/2001 | Luehmann |
| 6,855,760 | B1 | 2/2005 | Kirsten et al. |
| 10,618,268 | B2 | 4/2020 | Kernbaum et al. |
| 2017/0080603 | A1 | 3/2017 | Lovis et al. |
| 2020/0016794 | A1 | 1/2020 | Konishi et al. |

FOREIGN PATENT DOCUMENTS

| | | | |
|---|---|---|---|
| CA | 2073092 A1 | 1/1993 | |
| CA | 2299353 A1 | 2/1999 | |
| CN | 108724534 A | 11/2018 | |
| DE | 4230116 A1 | 3/1994 | |
| DE | 4328108 A1 | 2/1995 | |
| DE | 4340087 A1 | 6/1995 | |
| DE | 4424143 A1 | 1/1996 | |
| DE | 19526351 A1 | 1/1997 | |
| DE | 19904835 A1 | 8/2000 | |
| EP | 0543302 B1 | 10/1996 | |
| JP | 2000331384 A | * 11/2000 | ............. B29B 17/02 |
| WO | 8701724 A1 | 3/1987 | |
| WO | 9412582 A1 | 6/1994 | |
| WO | 2015000681 A1 | 1/2015 | |

OTHER PUBLICATIONS

International Organization for Standardization, "Essential oil of Melaleuca, terpene-4-ol (tea tree oil)," 2017. (Year: 2017).*
Hubner, Gunter, "Frontal—und Konterdruck," Thieme Rompp, 2008, Retrieved from the Internet: <URL:https://roempp.thieme.de/lexicon/RD-06-01930>, 4 pages.
Habenicht, Gerd, "Kleben: Grundlagen, Technologien, Anwendungen," 5th ed., Springer, 2005, Chapter 2.3.
Sastri, V.R. and Tesoro, G.C., "Reversible Crosslinking in Epoxy Resins", Journal of Applied Polymer Science, 39, pp. 1439 to 1457 (1990).
International Search Report in PCT/EP2021/057041, mailed Jun. 16, 2021, 3 pages.

* cited by examiner

*Primary Examiner* — Philip C Tucker
*Assistant Examiner* — Brian R Slawski
(74) *Attorney, Agent, or Firm* — The Webb Law Firm

(57) ABSTRACT

The invention relates to the use of a separating medium, containing at least one essential oil or consisting of at least one essential oil, selected from the group consisting of phenols, phenylpropanoids and furanocoumarins, for separating at least two joining parts which are joined by means of an adhesive bond.

17 Claims, No Drawings

USE OF ESSENTIAL OILS FOR SEPARATING ADHESIVE BONDS

CROSS-REFERENCE TO RELATED APPLICATIONS

This application is a national stage application under 35 U.S.C. 371 of PCT/EP2021/057041, filed Mar. 19, 2021, which claims the benefit of European application no. 20164802.9, filed Mar. 23, 2020, each of which is incorporated herein by reference.

BACKGROUND

In many branches of industry, especially in the metal-working industry such as e.g. the vehicle industry, in the manufacture of commercial vehicles and the supplier industries thereof, or else in the production of machines and household appliances or in the construction industry, identical or different metallic and non-metallic substrates are increasingly being bonded to one another in an adhesive or sealing manner. This type of joining of components is increasingly replacing the conventional joining processes such as riveting, screwing or welding because bonding/sealing offers a multiplicity of technological advantages. In contrast to the traditional joining processes such as welding, riveting and screwing, the release and separation of bonded components has in many cases not yet been satisfactorily solved.

EP-A-735121 describes a section of adhesive film for a residue-free and damage-free and releasable adhesive bond consisting of an adhesive film which is adhesive on both sides and has a tab protruding out from the adhesive film at which the adhesive bond can be released by pulling in the direction the plane of the adhesive bond. However, this method is only applicable when the adhesive layer of the adhesive film is a pressure-sensitive adhesive. With adhesive bonds of such a type, however, only low tensile/peel strengths can be achieved, meaning that this method is applicable only for the fixing of small articles such as hooks and the like in the household sector.

DE-A-42 30 116 describes an adhesive composition containing a blend of an aliphatic polyol with an aromatic dianhydride. This adhesive composition makes it possible to dissolve the adhesive bond in aqueous alkaline systems, with sodium carbonate solutions or aqueous alkali metal hydroxide solutions being mentioned specifically. It is proposed to use these adhesives which are soluble in aqueous alkaline mixtures for the efficient production of magnet parts and other small parts, where the adhesive is intended to be used only to produce auxiliary bonds during material processing. Very similar adhesives are also known as labeling adhesives, which allow the labels on beverage bottles and similar containers to be detached in the aqueous or aqueous alkaline environment.

DE-A-43 28 108 describes an adhesive for floor coverings and a method for releasing these adhesively bonded floor coverings using microwave energy. To this end, the adhesive should be electrically conductive and be softenable by means of a microwave apparatus. Specifically proposed are solvent-free contact adhesives based on (aqueous) polymer dispersions containing copper powder or aluminum powder. According to the teaching of this document, the adhesively bonded floor covering pieces are to be placed in a microwave apparatus for releasing the adhesive bond, in order that the adhesive layer can be softened so that the floor covering pieces can be manually detached after softening of the adhesive layer.

WO 94/12582 describes a pressure-sensitive adhesive based on a mixture of an aqueous polymer dispersion and an adhesive dissolved in an organic solvent, and also tackifiers and thickeners. This pressure-sensitive adhesive has a constant bonding force over a wide temperature range and allows the mechanical separation of the adhesive bonds. It is stated that these adhesive bonds are suitable for the adhesive bonding of insulating and/or decorative surface parts such as for example insulating materials or plastics films.

DE-A-195 26 351 describes a solvent gel for coatings, paints and adhesives based on organic solvents with the addition of wetting, thickening and other conventional agents. As a specific field of application, mention is made of the use as stripping agent for the removal of two-component coatings. Although it is mentioned that such mixtures are also suitable for use in two-component adhesives, the document does not provide any specific information with regard to the release of such adhesive bonds.

Similarly, WO 87/01724 describes a composition for the removal of cured polysulfide sealants or coatings. Here, an alkali metal or ammonium thiolate based on alkyl or phenyl thiolates is dissolved in a solvent or solvent mixture consisting of dimethylformamide or dimethylacetamide or a mixture thereof with aromatic solvents such as toluene or xylene, and this is applied to cured polysulfide sealants or coating materials in order to subsequently be able to remove the these from their substrates, such as for example aircraft tanks. No statements are made regarding the release of adhesive bonds.

In the work "Reversible Crosslinking in Epoxy Resins", Journal of Applied Polymer Science, 39, 1439 to 1457 (1990), V. R. Sastri and G. C. Tesoro describe epoxy resins having various epoxy equivalents crosslinked with 4,4'-dithioaniline. This document proposes grinding the crosslinked resin into 600 μm particles. This finely ground powder is then boiled under reflux in a solution of diglyme, hydrochloric acid and tributylphosphine until the ground resin has dissolved. U.S. Pat. No. 4,882,399 contains analogous disclosures from the same authors. Specific statements concerning releasable adhesive bonds are absent from both documents.

WO 99/07774 describes adhesives in which at least one formation component contains di- or poly sulfide bonds and which, after curing, can be released again by applying solutions of cleavage agents based on mercapto compounds. This makes it possible for adhesively bonded components to be separated again by chemical means in the bond joint. According to the teaching of this document, the cleavage agent can also be added to the adhesive formulation in a form inert at room temperature, and the cleavage can take place after activation of the reagent at elevated temperature. Specific forms of this inert form of the cleavage agent are not mentioned.

EP 2 668 226 B1 discloses a separating medium for multilayer systems that consists of a nanoscale dispersion containing an organic component, an aqueous component, and a surfactant. The method is aimed at the recycling of photovoltaic modules.

DE-A-199 24 138 describes adhesive compositions containing nanoscale particles having ferromagnetic, ferrimagnetic, superparamagnetic or piezolelectric properties in the binder system. These adhesive compositions are suitable for being used to produce releasable adhesive bonds. Under the action of electromagnetic radiation, these adhesive compounds can be heated to such an extent that the adhesive bond is easily releasable.

DE-A-35 01 490 describes a glass pane that has been bonded into the frame of an automobile body using an elastomeric crosslinked adhesive. This pane has on its surface in the adhesive region a conductive strip provided with power connections which on its side facing the adhesive bears a separating layer formed from a thermally meltable material such as soft solder or thermoplastic. To release the adhesive bond, the conductive strip is supplied with current and heats up, the separating layer melts and the pane can be released from the body.

EP-A-0521825 describes a releasable adhesive bond in which the parts bonded to one another are joined by means of a bead of adhesive introduced between them. This bead of adhesive contains a two-dimensional thermoplastic separating element. This thermoplastic separating element contains intrinsically conductive polymers, electrically conductive carbon blacks, graphite, metal powder, metal fibers or metal needles, metal-coated fillers, metal-coated glass microspheres, metal-coated textile fibers, or mixtures of these materials. When the adhesive bond is heated by current or the supply of radiation, this thermoplastic separating layer softens and as a result the parts bonded to one another can be mechanically separated from one another. EP-A-521825 specifically proposes using such releasable adhesive bonds in direct glazing in vehicle construction.

DETAILED DESCRIPTION OF THE INVENTION

What are known as multilayer composites are a further area in which the release and separation of bonded adherends has in many cases not yet been satisfactorily solved.

Multilayer composites used, for example, for the packaging of foodstuffs consist of at least two foil/film layers that are bonded to one another over their surface area. The foils/films are, for example, polymer films produced from polyethylene, polypropylene, polyester and polyamide, or aluminum foils, or they are composed of paper or plant fibers.

Multilayer composites generally contain a layer of printing ink which can be applied to the polymer films by frontal printing or by reverse printing (https://roempp.thieme.de/roempp4.0/do/data/RD 01930). The polymer films may also be coated with aluminum by vapor deposition. In the context of the present invention, polymer films provided with printing ink or coated with aluminum by vapor deposition are considered to be a single layer.

2-layer (duplex composites) or 3-layer (triplex composites) are generally used for food packaging. However, multilayer composites having more than three layers are also possible.

In many cases, the various layers are bonded to one another over their surface area by means of an adhesive polymer. This is generally done using one-component or two-component polyurethane adhesive polymers, which are applied as a solvent-free, solvent-containing or aqueous adhesive to at least one of the respective layers to be bonded before the layers to be bonded are bonded to one another. The weight of adhesive polymers applied between each two layers to be bonded is between 0.5 g/m$^2$ and 5 g/m$^2$, depending on the type of adhesive. This does not include any solvent or water present in the adhesive. Adhesion promoters, based for example on polyurethane, may also be used in analogous manner. This is often the case, for example, with co-extruded polymers, such as the abovementioned co-extruded polyolefin films having an ethylene vinyl alcohol inner layer. The adhesive or adhesion promoter is not considered to be a layer.

The advantages of multilayer composites for packaging foodstuffs—compared to other types of packaging such as glass or metal packagings—are not only the low costs and low weight but also the small space requirement of the packaged foodstuff.

However, multilayer composites have the disadvantage that after the foodstuff has been consumed they can be separated into the individual film layers again only with difficulty. Separation into the individual layers is however expedient in order that the polymers or the aluminum can be returned to the reusable material cycle as materials of a single type.

The German Packaging Act stipulates a recycling rate of 63% for plastic packaging as from 2022. It is expedient when recycling results in plastics that are of the highest possible quality and are as far as possible of a single type only. In order to allow sorting of the individual film layers according to type, the layers must be separated from one other. However, separation of the layers is non-trivial because the crosslinked adhesive polymers have only low solubility.

Special separation methods have by now already been developed that can be used for individual film combinations or plastics.

For instance, patent EP 0 543 302 B1 discloses a process for separating aluminum foil and polyethylene or polyester film under the action of fatty acids and in a closed vessel at 100° C. to 122° C.

A disadvantage of this invention is that only selected foil/film combinations can be separated. Use for the separation of all multilayer composites used for food packaging is not possible with this process.

WO 2015/000681 A1 describes a solvent-based plastics recycling process with which polymers can be recovered from plastic waste. The process is based on the co-use of thermal stabilizers in a paraffinic hydrocarbon mixture. The polymer dissolved in the hydrocarbon mixture at elevated temperature precipitates on cooling. The polymer is separated off mechanically and the hydrocarbon mixture present in the polymer is removed by applying a vacuum, for example in a vented extruder. The thermal stabilizer prevents polymer degradation of the dissolved polymer. The recovered polymer contains 50-1000 ppm of the hydrocarbon mixture.

US 2017/0080603 A1 describes a process for separating packaging materials, wherein the separating liquid comprises a carboxylic acid and a swelling agent, the latter being a hydrocarbon solvent such as toluene, xylene, ethylbenzene, cyclohexane or decalin, such as olefins, terpenes, ketones, ethers or esters.

There is therefore still a need for alternative methods for separating adherends which are bonded to one another by means of adhesive bonds, which do not have the disadvantages of the prior art.

The method should as far as possible be possible without the additional use of hazardous substances or highly flammable substances, it should be non-destructive with respect to the adherends and should bring about a maximally effective, i.e. complete separation of the adherends.

The problem has been solved by the use of a separating medium containing at least one essential oil, selected from the group consisting of phenols, phenylpropanoids and furanocoumarins, for the separation of adherends which are bonded to one another by means of adhesive bonds.

A subject of the present invention is the use of a separating medium, containing at least one essential oil or consisting of at least one essential oil, selected from the group consisting of phenols, phenylpropanoids and furanocoumarins, for the separation of an assembly of adherends, containing or consisting of:

i) 2 adherends which are bonded to one another by means of an adhesive or an adhesive mixture, or ii) more than 2 adherends which are bonded to one another in that between 2 adjacent adherends there is located in each case an adhesive or an adhesive mixture, wherein the adhesives or adhesive mixtures present between each 2 adjacent adherends bonded to one another may be the same or different.

A further subject of the present invention is a method for separating an assembly of adherends, containing or consisting of i) 2 adherends which are bonded to one another by means of an adhesive or an adhesive mixture, or ii) more than 2 adherends which are bonded to one another in that between 2 adjacent adherends there is located in each case an adhesive or an adhesive mixture, wherein the adhesives or adhesive mixtures present between each 2 adjacent adherends bonded to one another may be the same or different, by treatment with a separating medium, containing at least one essential oil or consisting of at least one essential oil, selected from the group consisting of phenols, phenylpropanoids and furanocoumarins.

In embodiment ii), the adhesives or adhesive mixtures present between each 2 adjacent adherends bonded to one another are preferably the same.

In the context of the present invention, an adhesive mixture is understood to mean 2 or more adhesives. These may or may not be mixed with one another. With 3 or more adhesives, it is also possible that a portion of the adhesives is mixed and the remaining portion of the adhesives is unmixed. This would be the case, for example, for an adhesive layer that has been obtained in that first a single adhesive was applied to one adherend, to which two adhesives mixed with one another were then applied, before the second adherend was adhesively bonded to the adhesive layer thus obtained.

An adhesive bond is defined according to EN 923 (German version EN 923:2015) as a connection produced with adhesive between two adherends.

An adhesive is a non-metallic substance that is able to bond materials through surface adhesion (adhesion) and its internal strength (cohesion). It is therefore a process material which only develops its mechanical strength via a (physical or chemical) setting reaction during manufacturing and which in the joining process of adhesive bonding is used to bond various adherends.

Adherends are understood to mean two or more workpieces (having geometrically defined shape or formless substances) which are permanently bonded to one another. A joining process is accordingly a process that is used to permanently bond workpieces to one another.

When producing an adhesive bond, at least one precoat (for example a primer, adhesion promoter or priming agent) may be applied to the workpiece surfaces prior to the application of the adhesive in order to improve the adhesion and/or the stability of an adhesive bond.

Priming agents are applied to the surface of an adherend prior to application of the adhesive, primarily to reduce the absorbency (absorption capacity) of the workpiece to be joined.

Primers or adhesion promoters are applied to a surface of an adherend prior to application of the adhesive primarily for improving the adhesion and/or the stability of an adhesive bond.

Primers, adhesion promoters, and priming agents can set chemically or physically after application.

In the further description, precoat, primer, priming agent, and adhesion promoter refer both to the state prior to and to the state after setting (process in which an adhesive acquires its cohesive strength and the adhesive bond develops its physical and chemical properties).

The separating medium used may be the essential oil or the mixture of essential oils itself, a single-phase mixture of the essential oil or of the mixture of essential oils with other substances, or a multiphase composition containing the essential oil, for example an aqueous emulsion of the essential oil or of the mixture of essential oils.

The separating medium preferably consists of an aqueous emulsion of the essential oil or of the mixture of essential oils.

In a further preferred embodiment, the separating medium contains an aqueous emulsion of the essential oil or of the mixture of essential oils. In this embodiment, the separating medium preferably does not contain any carboxylic acid.

Preference is given to using in the method an aqueous emulsion which contains >0.1% by volume, particularly preferably ≥0.5% by volume, very particularly preferably ≥1% by volume, even more preferably ≥10% by volume, of essential oil or of essential oils, based on the volume of water used.

Examples of essential oils from the group of phenols, phenylpropanoids and furanocoumarins that may be mentioned include carveol, carvacrol, thymol, apiol, methyl trans-cinnamate, cis- and trans-anethole, dillapiole, estragole, eugenol, and coriandrin.

The essential oils may be of natural origin, i.e. obtained from plants or plant parts, or they may be prepared synthetically.

The essential oil may also be chemically modified by oxidation, esterification or alkylation.

Among the groups of substances mentioned above, phenylpropanoids are particularly suitable for use in the method according to the invention.

The compound eugenol is very particularly suitable.

The abovementioned essential oils from the group of phenols, phenylpropanoids and furanocoumarins or mixtures of these oils may also be used in the method according to the invention in a blend with essential oils from the substance groups of acyclic and cyclic mono- and sesquiterpenes. Examples of acyclic and cyclic mono- and sesquiterpenes that may be mentioned include ocimene, myrcene, limonene, α-terpinene, phellandrene, α-pinene, camphene, linalool, geraniol, menthol, sabinol, borneol, neral, citronellal, carvone, menthone, camphor, fenchone, menthofuran, cineole, anethofuran, geranyl acetate, linalyl acetate, bornyl acetate, isobornyl acetate, farnesol, farnesene, α-bisabolol, α-caryophyllene, chamazulene and β-caryophyllene. However, preference is given to using essential oils and mixtures of essential oils selected exclusively from the group of phenols, phenylpropanoids and furanocoumarins.

In a preferred embodiment, the aqueous emulsion contains ≥0.5% by volume, preferably ≥0.9% by volume, of a mixture of essential oils, based on the volume of water used, the proportion by volume of eugenol in the mixture of essential oils being at least (≥) ⅓.

The effectiveness of the method can be increased by adding surface-active substances, e.g. surfactants, emulsifiers to the mixture of water and essential oil(s).

In another embodiment, the separating medium contains, in addition to at least one essential oil, substances that are miscible therewith such as solvents or plasticizers.

The separating medium can be used to separate adherends bonded to one another by means of adhesives and made of various materials, where the adherends may consist of different or identical materials.

Materials suitable for production of the adherends include for example plastics, organic materials, wood, paper, metals, and mineral substances, such as concrete or gypsum.

The adherends may for example be in the form of foils/films, sheets or foams, or have complex three-dimensional shapes.

The adherends may be bonded to one another over their surface area, at the edges or at points.

Examples of materials that can be separated using the separating medium are multilayer composite materials, shaped parts laminated with foil/films such as furniture parts, decorative parts for automobile interiors (interior trim parts).

When selecting the adhesives, those skilled in the art have at their disposal a large number of different types. The adhesives used to bond the adherends may be formed from various chemical basic products. Examples of suitable adhesives are given in chapter 2.3 of EN 923 (German version EN 923:2015), in the book "Kleben" by G. Habenicht, 5th edition (ISBN 3-540-26273-3) 2005, Springer Verlag. Polyurethane adhesives in particular, and very particularly preferably polyurethane adhesives having polyester groups, are used.

When producing an adhesive bond, a precoat (primer, adhesion promoter and/or priming agent) may be applied to at least one surface of an adherend prior to application of the adhesive. The precoats that may be used can be formed from the same chemical basic products as the adhesives. Examples of precoats that may be used are silane-based precoats or polyurethane-based precoats, such as silane primers or polyurethane primers. Preference is given to using polyurethane-based precoats.

The precoats used in an adhesive bond may be formed from the same or from different chemical basic products as the adhesive(s) used in the adhesive bond. The precoat(s) and the adhesive(s) preferably differ in terms of their chemical structural components.

Polyurethane-based precoats and adhesives are described in detail in the prior art, for instance in Manufacturing Flexible Packaging, Thomas Dunn, ISBN 978-0-323-264-36-5, Ulrich Meier Westhues; Polyurethane, Lacke, Kleb- and Dichtstoffe, ISBN 978-3-86630-896-1. This list is not to be interpreted restrictively.

In a particular embodiment, the adhesive(s)/precoat(s) used may already contain the separating medium without the separating medium coming into contact with the adhesive(s)/precoat(s). For example, the adhesive(s)/precoat(s) may contain the separating medium in encapsulated, preferably microencapsulated, form.

Further subjects of the present invention are the use or the method as described above, characterized in that in the case of embodiment i), the adhesive is a polyurethane adhesive, preferably a polyurethane adhesive containing polyester groups, or the adhesive mixture contains at least one polyurethane adhesive, preferably at least one polyurethane adhesive containing polyester groups, in the case of embodiment ii), at least one of the adhesives is a polyurethane adhesive, preferably a polyurethane adhesive containing polyester groups, and/or at least one of the adhesive mixtures contains a polyurethane adhesive, preferably a polyurethane adhesive containing polyester groups.

The adhesive located between two adherends or the adhesive mixture located between two adherends is also referred to as adhesive layer in the context of the present invention. In the context of the present invention, an adhesive layer is for example understood to mean the application of the adhesive or the adhesive mixture to the adherend(s) over the surface area, at the edges and/or at points.

Further subjects of the present invention are also the use or the method as described above, characterized in that between at least one adherend and at least one adhesive layer there is additionally located at least 1 precoat, preferably a silane-based precoat and/or a polyurethane-based precoat.

Further subjects of the present invention are moreover the use or the method as described above, characterized in that at least one adhesive bonding the adherends or one adhesive mixture bonding the adherends and/or at least one precoat additionally present contains the separating medium in encapsulated, preferably microencapsulated, form.

DESCRIPTION OF THE METHOD

The materials to be separated are brought into contact with the separating medium for a determined time, specifically preferably at least (≥) 30 minutes, particularly preferably at least (≥) 1 hour.

This treatment weakens the strength of the adhesive and/or any precoat present to the extent that the adherends bonded by means of the adhesive can be separated by minor mechanical stress (for example shear stress).

To increase the effectiveness of the method, the adherends are optionally comminuted, for example using a cutting mill or a shredder. By comminuting the multilayer composite, the contact area between the separating medium and the adhesive or the precoat is enlarged. The penetration action of the separating medium into the adhesive or precoat layer is thus improved and the weakening of the adhesive or precoat layer can be achieved more rapidly.

The materials to be separated can be brought into contact with the separating medium, for example by introducing the materials to be separated into the separating medium or coating the materials to be separated with the separating medium.

In a particular embodiment of the method, the adhesive or precoat used already contains the separating medium, without the separating medium coming into contact with the adhesive or precoat. For example, the adhesive or precoat may contain the separating medium in microencapsulated form. In this case, the separating medium is only released in the course of the method and brought into contact with the adhesive or precoat by being released from the encapsulation. This may be done, for example, by means of mechanical stress or heating.

Operation in a batch process or in a continuous process is possible.

After the treatment with the separating medium, the separated materials are separated from the separating medium optionally by sieving, by filtration or by centrifugation. Materials still adhering to one another, which have not yet been completely released from one another after the treatment with the separating medium, may be separated from one another mechanically, for example by a pair of shearing rollers.

The materials may be separated according to type by the known separating methods, for example flotation, floating or settling behavior, or by means of eddy current (separation of aluminum).

Adhering essential oil can either be washed off by a washing process with concomitant use of suitable surfactants.

After optionally drying the separated, cleaned materials, they can be returned to the reusable material cycle again.

A further subject of the present invention is an assembly of adherends, containing or consisting of
- a) i) 2 adherends which are bonded to one another by means of an adhesive or an adhesive mixture, or
  ii) more than 2 adherends which are bonded to one another in that between 2 adjacent adherends there is located in each case an adhesive or an adhesive mixture, wherein the adhesives or adhesive mixtures present between each 2 adjacent adherends bonded to one another may be the same or different,
  wherein in embodiment i) and ii) between at least one adherend and at least one adhesive layer there is optionally additionally located at least 1 precoat, preferably a silane-based precoat and/or a polyurethane-based precoat,
- b) a separating medium in encapsulated, preferably microencapsulated, form, wherein the encapsulated separating medium is contained in at least one adhesive bonding the adherends or one adhesive mixture bonding the adherends and/or optionally in at least one precoat additionally present,
and the separating medium contains at least one essential oil or consists of an essential oil, selected from the group consisting of phenols, phenylpropanoids and furanocoumarins.

EXAMPLES

Multilayer Composites:
Multilayer Composite 1: Polyester/printing ink//aluminum//polyethylene
Packaging Eduscho Espresso (label: 29.06.2020 L9031 H57/2 08:56)
Multilayer composite 2: Polyester/printing ink//polyethylene
Josera "Minivita" dry dog food
Polyester and printing ink are together regarded as a single layer.
// means adhesive layer based on a polyurethane adhesive.

Essential Oils:
Source for all of the oils mentioned below: Sigma-Aldrich, Munich
Eugenol (CAS No. 97-53-0)—phenylpropanoid
trans-Anethole (CAS No. 104-46-1) (phenylpropanoid)
Methyl trans-cinnamate (CAS No.: 1754-62-7) (phenylpropanoid derivative)
Linalool (CAS No. 78-70-6)—monoterpene
Citronellal (CAS No. 106-23-0)—monoterpene Determination of Composite Strength:
The composite adhesion of the foil/film layers is determined using the Zwick 5 kN Allround table-top testing machine in accordance with DIN 55533-5 in a 180° peel test. The reported values are the average values from five individual measurements.

Experiment 1: Visual Inspection of the Separation (Table 1)

The multilayer composites are cut with scissors into squares approx. 1 cm² in size. 10 pieces of the multilayer composites of approx. 1 cm² are placed in a 250 ml multi-neck stirred flask apparatus heated with an oil bath and comprising stirrer, thermometer, and reflux condenser.

The stirred apparatus is filled with 100 ml of water, or with 100 ml of water with 0.1 ml, 0.5 ml, 1 ml, or 10 ml of essential oil, and heated to boiling temperature. The contents of the flask are boiled under reflux at approx. 100° C. for up to 20 h. The multilayer composites are visually checked for separation at intervals of 1 hour.

Multilayer Composite 1

TABLE 1

| | 1 h | | 2 h | | 3 h | | 20 h | |
|---|---|---|---|---|---|---|---|---|
| | Al//PET | Al//PE | Al//PET | Al//PE | Al//PET | Al//PE | Al//PET | Al//PE |
| 100 ml water | − | − | − | − | − | − | − | − |
| +0.1% eugenol | − | − | − | − | − | − | − | − |
| +0.5% eugenol | − | − | − | − | −+ | −+ | 0 | 0 |
| +1% eugenol | −+ | −+ | + | + | ++ | ++ | 0 | 0 |
| +10% eugenol | + | + | ++ | ++ | 0 | 0 | 0 | 0 |
| +1% trans-anethole | 0 | 0 | 0 | 0 | − | ++ | 0 | 0 |
| +1% methyl trans-cinnamate | 0 | 0 | 0 | 0 | ++ | + | 0 | 0 |
| +1% linalool | 0 | 0 | 0 | 0 | − | −+ | 0 | 0 |
| 1% citronellal | 0 | 0 | 0 | 0 | − | + | 0 | 0 |
| +0.33% eugenol +0.33% trans-anethole +0.33% methyl trans-cinnamate | 0 | 0 | 0 | 0 | + | ++ | 0 | 0 |

TABLE 1-continued

|  | 1 h | | 2 h | | 3 h | | 20 h | |
| --- | --- | --- | --- | --- | --- | --- | --- | --- |
|  | Al//PET | Al//PE | Al//PET | Al//PE | Al//PET | Al//PE | Al//PET | Al//PE |
| +1% eugenol +1% trans-anethole +1% methyl trans-cinnamate | 0 | 0 | 0 | 0 | ++ | ++ | 0 | 0 |

−: no change in composite adhesion/no visible separating effect
−+: separation of layers at the cut edges
+: delamination already visible over a wide area
++: complete delamination
0: not tested
% = percent by volume A separating effect occurs both with terpenes and phenylpropanoids, the effect of the phenylpropanoids being greater than that of the terpenes. The addition of 1% eugenol results in the composite coming completely apart after just 3 hours. In pure water, there is no separation of the composites even after 20 hours.

Experiment 2: Determination of the Decrease in Composite Strength of the Foil/Film Layers (Table 2)

Strips of the multilayer composites 15 mm wide and 20 cm long are cut out from the packagings. The strips were boiled in 100 ml of water, or in 100 ml water mixed with 1 ml of eugenol or trans-anethole, in a 250 ml multi-neck stirred flask apparatus comprising reflux condenser under reflux (p~1 bar) for 3 h. After boiling, the strips were removed from the apparatus and the composite adhesion was measured within 30 min. The composite adhesion of the foil/film layers was determined using the Zwick 5 kN Allround table-top testing machine in accordance with DIN 55533-5 in a 180° peel test. The detached ends of 15 mm wide strips of the film composites are clamped in the fixing clamps of the Zwick testing machine. During the measurement, the test clamps are pulled apart at a rate of 100 mm/min. The reported values are the average values from five individual measurements.

TABLE 2

|  | Composite 1 | | Composite 2 |
| --- | --- | --- | --- |
| After 3 h | Al//PET | Al//PE | PET//PE |
| 100 ml water | 1.6 | F* | 2.2 |
| +1% eugenol | 0.7 | 1.0 | 0.4 |
| +1% trans-anethole | 0.4 | 0.6 | 0.5 |
| +0.33% eugenol + 0.33% trans-anethole + 0.33% methyl trans-cinnamate | 0.4 | 0.2 | / |
| +1% eugenol + 1% trans-anethole + 1% methyl trans-cinnamate | <0.1 | 0.6 | / |

% = percent by volume
*film composite could not be separated. Attempting to do so resulted in immediate tearing of a foil/film.

The weakening of the adhesive layer by the phenylpropanoids is evident. After treatment with the aqueous mixture, the composite strength of the multilayer composites is markedly lower than that of the multilayer composite treated only with water.

The invention claimed is:

1. A method for separating an assembly of adherends comprising:
   i) 2 adherends which are bonded to one another by means of an adhesive or an adhesive mixture, or
   ii) more than 2 adherends which are bonded to one another in that between 2 adjacent adherends there is located in each case an adhesive or an adhesive mixture, wherein the adhesives or adhesive mixtures present between each 2 adjacent adherends bonded to one another may be the same or different,
   by treatment with a separating medium, comprising at least one essential oil, wherein the at least one essential oil comprises a compound selected from the group consisting of phenols, phenylpropanoids and furanocoumarins.

2. The method of claim 1, wherein the separating medium is present
   a) in the form of a single-phase mixture of the at least one essential oil with at least one other substance,
   or
   b) in the form of a multiphase composition of the at least one essential oil with at least one other substance.

3. The method of claim 2, wherein the separating medium is present in the form of an aqueous emulsion of the at least one essential oil.

4. The method of claim 1, wherein the adherends each independently contain at least one material selected from the group consisting of plastics, organic materials, wood, paper, metals, mineral substances, and mixtures thereof.

5. The method of claim 1, wherein the adhesive or the adhesive mixture comprises at least one polyurethane adhesive.

6. The method of claim 1, wherein between at least one adherend and at least one adhesive layer there is additionally located at least 1 precoat.

7. The method of claim 6, wherein the precoat is a silane-based precoat or a polyurethane-based precoat.

8. The method of claim 6, wherein the precoat comprises the separating medium in encapsulated form.

9. The method of claim 2, wherein at least one adhesive bonding the adherends or one adhesive mixture bonding the adherends comprises the separating medium in encapsulated form.

10. The method of claim 9, wherein the treatment of the assembly of adherends is effected by bringing it into contact with the separating medium and the separating medium is released from the encapsulation.

11. The method of claim 10, wherein the separating medium is released from the encapsulation by mechanical stress or heating.

12. The method of claim 1, wherein the treatment of the assembly of adherends is effected by bringing it into contact with the separating medium.

13. The method of claim 12, wherein the assembly of adherends is introduced into the separating medium.

14. The method of claim 12, wherein the assembly of adherends that has been brought into contact with the separating medium is thermally treated.

15. The method of claim 1, wherein the method is conducted in continuous operation.

16. The method of claim 1, wherein after the treatment with the separating medium,
   i) adherends still adhering to one another are mechanically separated from one another, and
   ii) the separating medium is removed from the adherends that have been separated from one another, and
   iii) optionally, the adherends that have been separated from one another are separated in a type-specific manner according to materials.

17. An assembly of adherends comprising:
   a)i) 2 adherends which are bonded to one another by means of an adhesive or an adhesive mixture,
   or
   ii) more than 2 adherends which are bonded to one another in that between 2 adjacent adherends there is located in each case an adhesive or an adhesive mixture, wherein the adhesives or adhesive mixtures present between each 2 adjacent adherends bonded to one another may be the same or different,
   wherein in embodiment i) and ii) between at least one adherend and at least one adhesive layer there is optionally additionally located at least 1 precoat,
   b) a separating medium in encapsulated form, wherein the encapsulated separating medium is contained in at least one adhesive bonding the adherends or one adhesive mixture bonding the adherends or optionally in at least one precoat additionally present,
   and the separating medium comprises at least one essential oil, wherein the at least one essential oil comprises a compound selected from the group consisting of phenols, phenylpropanoids and furanocoumarins.

\* \* \* \* \*